United States Patent

Sellers, Jr. et al.

[11] 3,844,399
[45] Oct. 29, 1974

[54] LOG CONVEYING APPARATUS
[75] Inventors: H. Charles Sellers, Jr.; Ronnie J. Hatchel, both of Birmingham, Ala.
[73] Assignee: Beloit-Passavant Corporation, Birmingham, Ala.
[22] Filed: Mar. 9, 1973
[21] Appl. No.: 339,617

[52] U.S. Cl. ......... 198/165, 144/242 R, 144/246 F, 144/253 C, 198/29, 214/1 PE, 226/108, 226/177
[51] Int. Cl. ............................................. B27b 31/00
[58] Field of Search ............ 198/165, 29, 162, 200, 198/37; 144/242 R, 242 D, 242 E, 245 R, 245 A, 246 R, 246 F, 247, 249 B, 253 C, 136 R, 208 E; 226/177, 108; 214/1 P, 1 PA, 1 PB, 1 PE, 3, DIG. 3, DIG. 4

[56] References Cited
UNITED STATES PATENTS

| 2,794,466 | 6/1957  | Leffler      | 144/246 F |
| 2,815,776 | 12/1957 | Annis et al. | 144/246 F |
| 2,821,220 | 1/1958  | Nicholson    | 144/242 R |
| 2,916,633 | 12/1959 | Stone et al. | 250/223   |
| 3,510,042 | 5/1970  | Romere       | 226/177   |

Primary Examiner—Richard A. Schacher
Assistant Examiner—Jerry V. Nase
Attorney, Agent, or Firm—Jennings, Carter & Thompson

[57] ABSTRACT

A log conveyor having a plurality of articulated, roller tipped arms which resiliently bear against opposite sides of a log independently of each other thereby continuously supporting the log while guiding over its surface irregularities. The arm ends which do not contact the log are held against lateral movement relative to the logs path of travel so that reaction forces caused by resilient movement of one arm are not translated to the corresponding arm on the other side of the log which allows the log to be conveyed along a straight path despite its surface irregularities.

8 Claims, 6 Drawing Figures

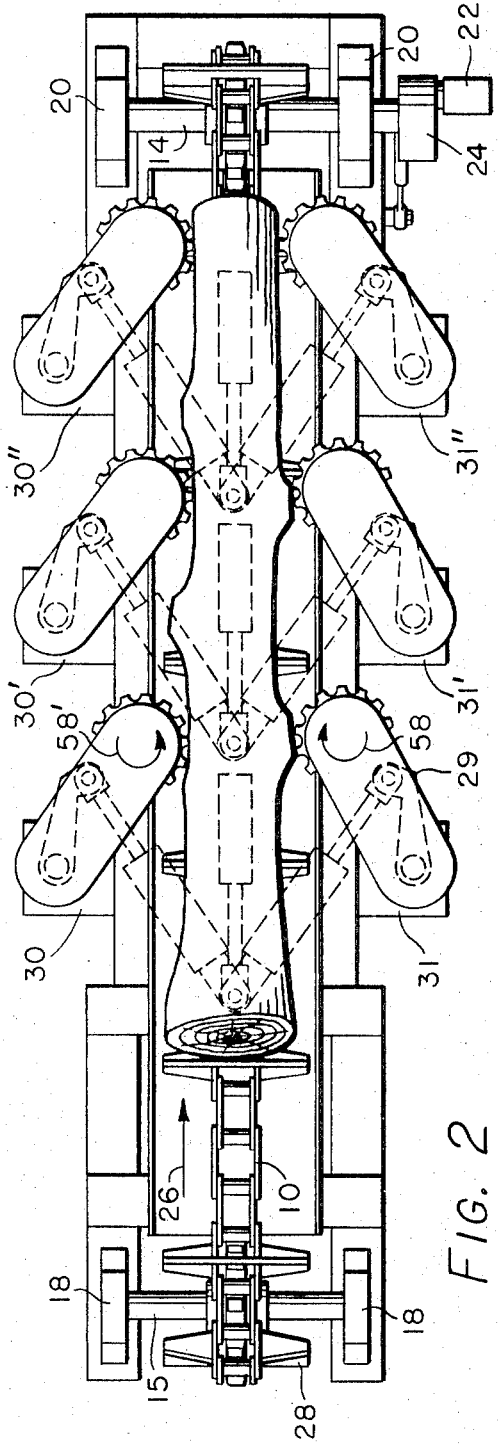
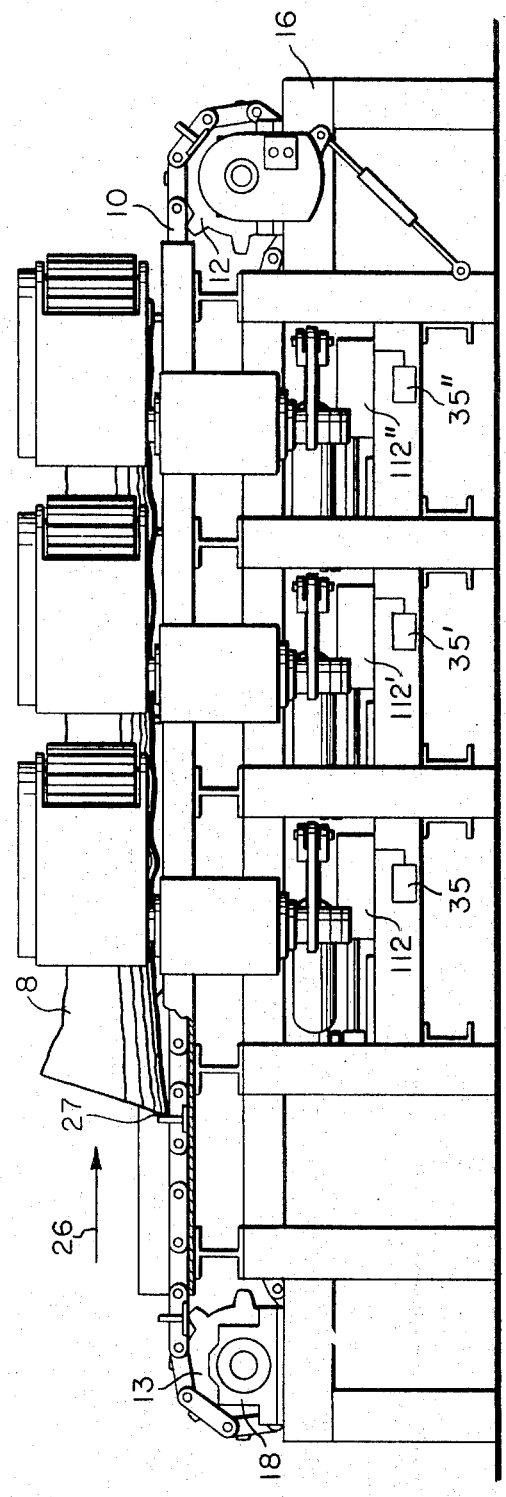
FIG. 2
FIG. 1

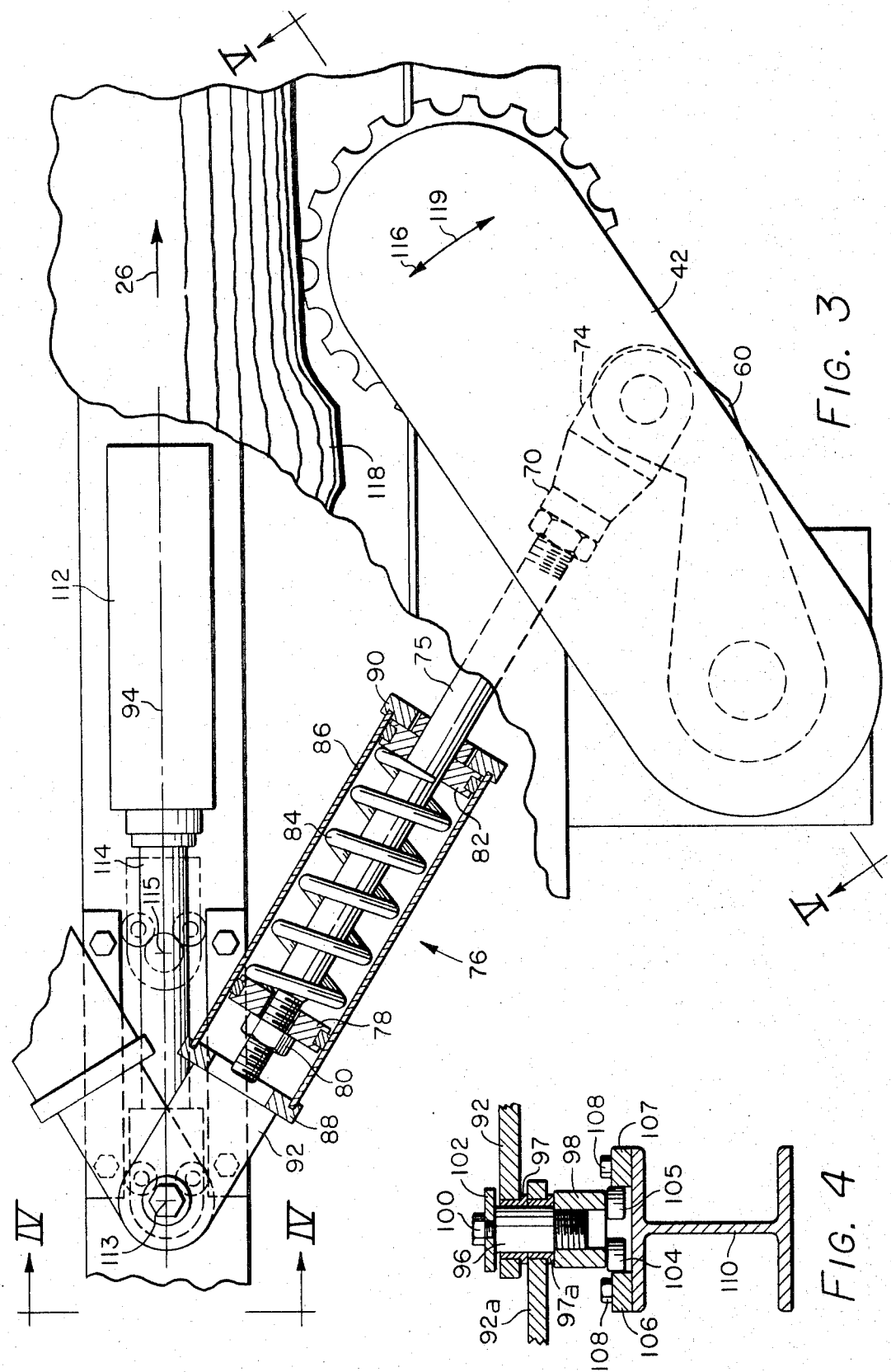

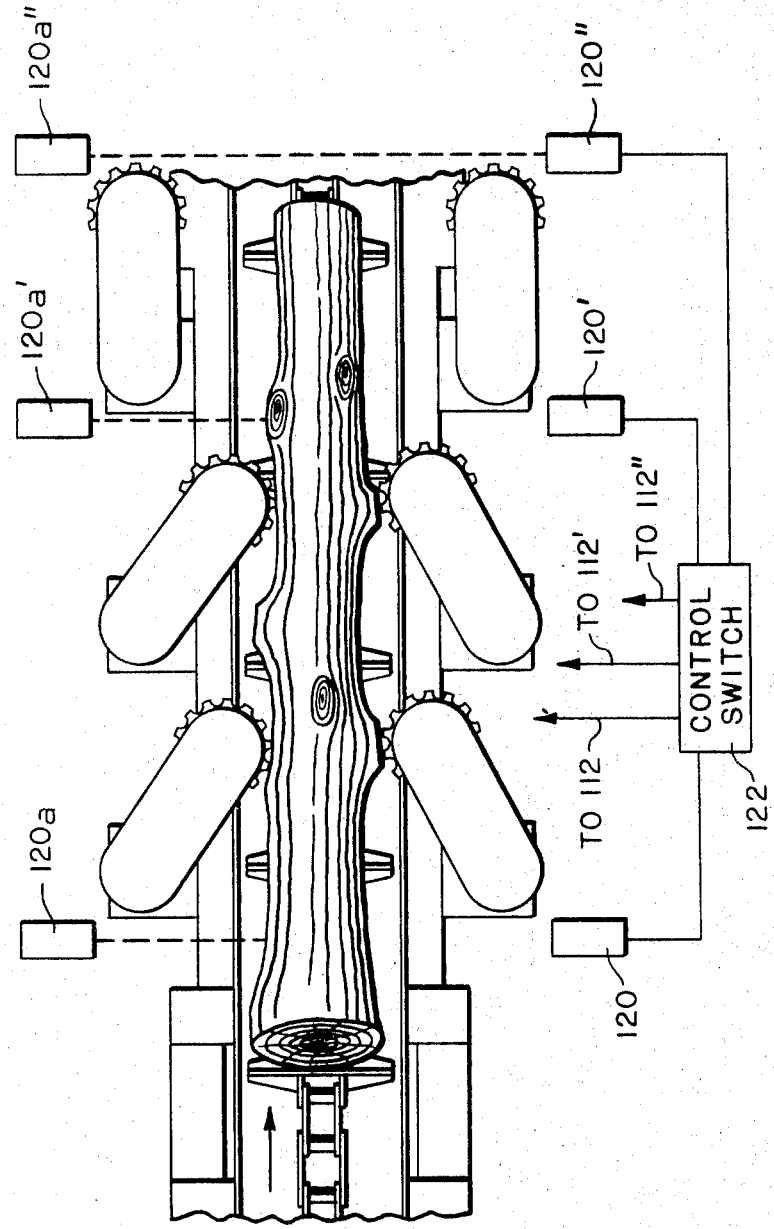

LOG CONVEYING APPARATUS

FIELD OF THE INVENTION

This application relates to conveyors for transferring rough logs for further processing such as to a chipper. Chipping and sawing equipment often operate on both sides of a log simultaneously and it is important that the logs are fed into them aligned so that the longitudinal axis of each log coincides as nearly as possible to the centerline of the equipment.

Prior logging conveyors either had no special provisions for centering the logs, or merely equipped the conveyor with sidewalls in an attempt to channel the logs into the center.

Regardless in the manner used in centering logs, prior conveyors were ineffective or incapable of conveying, and simultaneously holding, the logs in a centered position against movement caused by contact with the chipper head or saw. Obviously, rough logs are not straight or symmetrical. Their surface has irregular contours and the stubs of broken branches protrude such that contact with rigid sidewalls or guides is likely to cause wedging or skewing of the log on the conveyor. As the log is conveyed, the surface irregularities react against the sidewalls to move the log up and down and from side to side such that it is virtually impossible to control its position upon exit from the conveyor. Misaligned logs entering a chipper or saw can damage the tools as well as produce more waste during the cutting operation.

SUMMARY OF THE INVENTION

This invention mitigates the problems associated with guiding and holding the logs as they are conveyed into a cutting station. The logs are engaged by powered rollers on both sides as they move on the conveyor. The rollers are mounted on articulated arms having a joint pivotally mounted on the conveyor frame. The arm ends not engaging the logs are slidably mounted on the frame for reciprocal movement parallel to the path of log travel. The arms are urged by resilient means toward the log so that the rollers will maintain supporting and guiding contact with the log surface at all times as they move laterally in and out while following the irregular contours of the log as it passes.

The arm ends slidably mounted on the frame permit the arm roller ends on either side of the log to be pressurably positioned against the surface while preventing forces produced by resilient movement of one roller from inducing a reaction force in the opposite arm. Thus, neither the supporting force nor the lateral movement of the log contacting arm ends produces or induces a reaction force or movement in the opposed linked, but independently operable, arm. This permits the log to be supported and guided without skewing as it travels on the conveyor.

Therefore, it is an object of the invention to provide a log conveyor which continuously restrains the logs against lateral movement as they are conveyed.

Another object of the invention is to provide a log conveyor which resiliently and continuously contacts, holds and guides the logs as they are conveyed.

Another object of the invention is to provide a log conveyor which allows the logs to be conveyed while maintaining its logitudinal axis relatively coincident with the direction of the path of travel at all times.

A feature of the invention is the provision of resiliently mounted rollers which maintain guiding contact with the log while tracking over its irregular surface.

Another feature of the invention is the provision of guide rollers tracking on opposite sides of the log which operate independently of each other and do not induce reactive forces in one another.

Still another feature of the invention is the provision of opposed pairs of guide rollers which are linked together for coordinated movement into position against the log surface while being capable of resiliently bearing against, and moving over, the log surface independently of one another while providing substantially constant lateral guiding force against the log surface.

These and other features, objectives and advantages of the invention will become apparent as the following description of the preferred embodiment is read in conjunction with the attached drawings.

IN THE DRAWINGS

FIG. 1 is a side elevational view of the conveyor.

FIG. 2 is a top view of the conveyor and log shown in FIG. 1 showing the opposed roller tipped arm members guiding over the irregular surface of the log.

Figure 5:
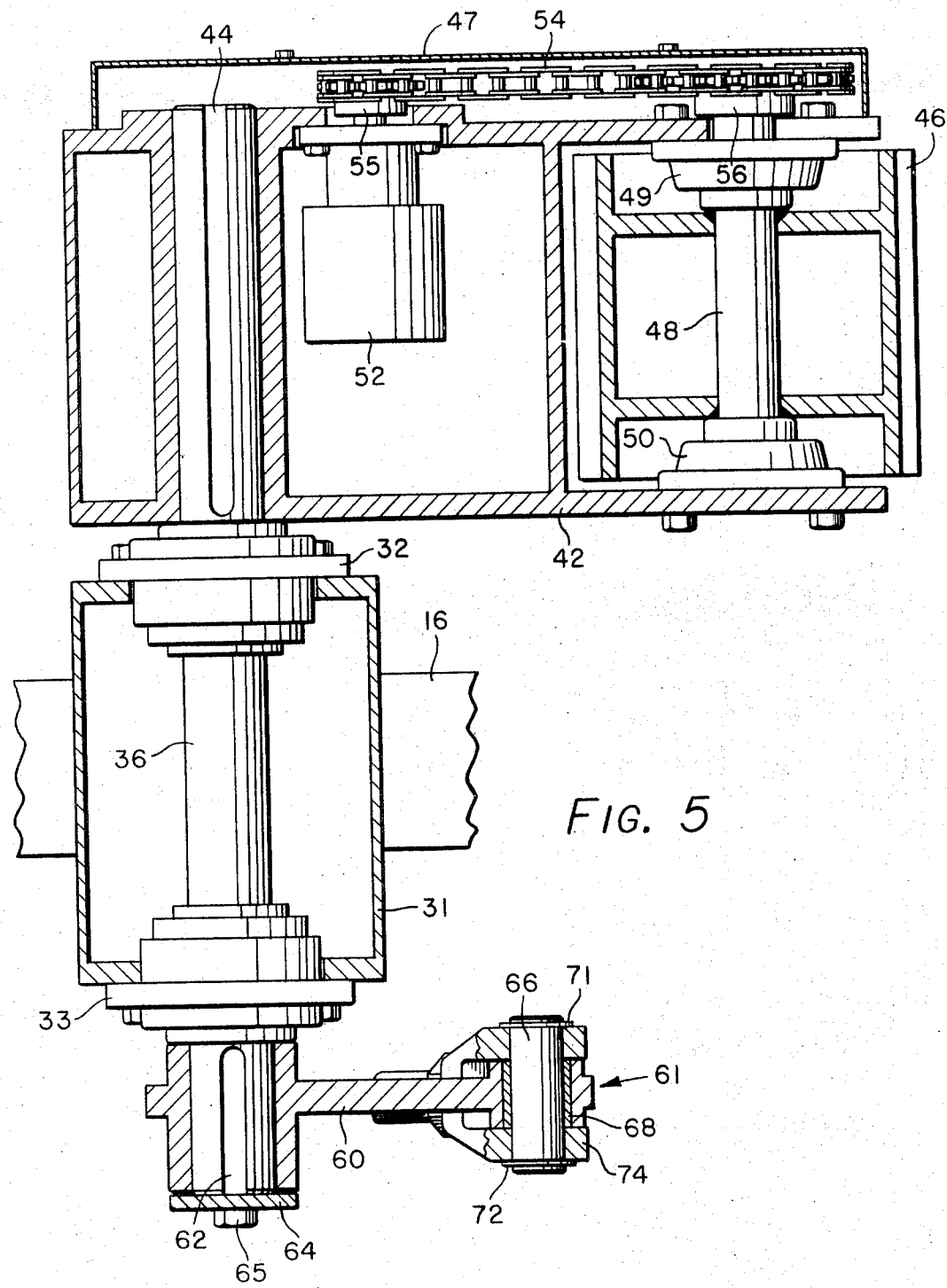

On FIG. 3 is a top view of a portion of a log shown in FIG. 2, but it is partially in section and broken away to show the arm spring construction and sliding mounting of the arms together and the manner in which they are linked to the frame.

FIG. 4 is a view through section IV—IV in FIG. 3 showing the manner in which the arms are mounted together for axial movement along the frame.

FIG. 5 is a view through section V—V in FIG. 3 showing the arm assembly construction.

FIG. 6 is another top view showing photo-electric cells mounted on either side of the conveyor to control the position of the arm assembly pairs relative to the log location on the conveyor.

DESCRIPTION OF THE PREFERRED EMBODIMENT

As shown in FIGS. 1 and 2, a continuous conveyor chain 10 is looped about sprockets 12, 13 which in turn are secured to shafts 14, 15 which are rotatably mounted onto frame 16 through bearing housings 18, 20. A motor 22 is connected to shaft 14 through a gear reduction unit 24 to drive the conveyor chain in the direction of arrow 26.

Attached to the conveyor chain at spaced intervals are a plurality of a lug plates 28 which support and engage the log, as at log end 27, to convey it to the next operating station, such as a chipper or saw, not shown.

On either side of frame 16 is mounted one member of a pair of opposed shaft brackets 30, 31. Two other similar pairs of brackets 30', 31' and 30", 31" are mounted in aligned downstream relation to the direction of log travel.

A log engaging arm assembly unit 29, actually made up of three arm segments shown in FIGS. 3 and 5 in more detail, is mounted on each bracket 30, 31, 30', 31' 30", 31" and since each arm assembly is identical in construction and operation, only the arm assemblies mounted in brackets 30, 31 will be described in detail. Corresponding elements in each arm assembly on the same side of the frame are identified with corresponding primed numerals and those corresponding elements on the other side are designated with the "a" suffix on the same numeral.

A shaft 36 is rotatably mounted in bracket 31 through bearings 38, 40 and secured with end caps 32, 33. A top arm segment 42 has one end keyed at 44 to the top of the shaft so as to be positioned substantially laterally to log 8. At the other end of arm segment 42, a fluted roller 46 is mounted on shaft 48 rotatably supported in bearings 49, 50. The rollers don't have to be fluted, but it augments their guiding contact on the log.

A power source, such as hydraulic motor 52, is mounted on the top arm segment and rotates roller 46 through a chain 54 looped about sprockets 55, 56 attached to the motor and shaft 48, respectively. The motor drives the roller in the direction of arrow 58 to assist in transporting log 8. A cover 47 covers the chain. Besides hydraulic motors, which are intended to include any pressurized liquid or gas prime mover, electrical motors and mechanical drives are also contemplated.

A connecting arm segment 60 is keyed to the lower end of shaft 36 with key 62 and an end cap 64 is secured to the end of the shaft with bolt 65 to restrain it from axial movement. The outer end 61 of connecting arm segment 60 has a pin 66 mounted in it through bushing 68. A bottom arm segment 70 has one end 74 formed into a clevis to receive the upper and lower ends of pin 66. A pair of snap rings 71, 72 secures the bottom and connecting arm segments on the pin and bushing 68 facilitates relative rotation between them in operation.

As shown in FIG. 3, the bottom arm segment 70 comprises the clevis shaped end 74 threaded onto the end of rod 75 which extends into a spring can 76. A collar 78 is secured to the inner end of rod 75 by nut 80 and another collar 82 is positioned on the opposite inner-end of spring can 76. A compression spring 84 is axially positioned around the rod to bear against collars 78, 82. An annular sleeve casing 86 forms the outer surface of the spring can between end caps 88, 90 in which it is securely mounted. An ear flange 92 extends inwardly from end cap 88 to the axially extending centerline 94 of frame 16.

In FIG. 4, corresponding ears 92, 92a are pressed over corresponding stacked bushings 97, 97a which are secured to pin 96 that is screwed into guide block 98. A bolt 100 secures washer 102 onto the top end of pin 96. Two pairs of cam follower bearings 104, 105 are mounted onto the bottom of the guide block and bear against corresponding guide rails 106, 107 which are mounted on, and extend parallel to the centerline 94 of, the frame 16. Bolts 108 secure the guide rails onto center beam 110 of the frame.

Although only one arm assembly 29 of each corresponding opposed pair has been described, the other arm assembly is identical and the conveyor may incorporate one or more pairs of arm assemblies. Each pair of arm assembly units comprises a log centering unit which operate as a unit to position the log. Three such pairs are shown in the preferred embodiment. Each individual arm assembly operates independently against the log surface to guide and hold the log against vertical and lateral movement.

In operation, a log 8 is brought onto the oncoming end of conveyor 16 and urged to travel in downstream direction 26 by contact with lug plates 28 on chain 10 driven by motor 22. As the log reaches the space between opposed fluted rollers 46, 46a, an operator activates hydraulic cylinder 112 to extend its rod 114 and move ear flanges 92, 92a rearwardly against the direction of arrow 26. This moves the bottom arm segments and rotates the connecting arm segments in the direction of arrowhead 116 inwardly toward the log and rollers 46, 46a are positioned against opposite sides of the log. The ear flanges are thus moved and secured to some desired spot between extended and contracted rod positions 113 and 115. Hydraulic motors 52, 52a are turning fluted rollers 46, 46a so their peripheral speed approximates the log conveyance speed to assist in conveying the log and facilitate their contact on the log surface as opposed arm assemblies urge and guide the log into the center of the conveyor which is considered to be in a vertical plane extending axially along centerline 94.

When a surface imperfection, such as branch nub 118, is encountered by roller 46, top arm segment 42 is moved laterally outwardly, indicated by arrowhead 119. Shaft 36 and connecting arm segment 60 rotate and bottom arm segment 70 elongates against the force of compression spring 84. Roller 46 maintains contact continuously and cooperates with opposed roller 46a to maintain lateral pressure on the log and keep it in centered position on the conveyor. At the same time, roller 46a may be moving inwardly to follow a concave contour on the other side of the log. Pivotable movement of one or both of top arm segments 42, 42a about their mounting shafts 36, 36a has no effect on the movement of the other or the guiding pressure the other exerts on the log. Furthermore, no arm assembly or pair of arm assemblies has any effect on the operation of, or force exerted by, any other arm assembly or a pair of arm assemblies on the conveyor. This is because hydraulic (gas or liquid) cylinder 112 (and hydraulic cylinders 112' and 112'') in cooperation with guide rails 106, 107 secures and maintains guide block 98 and, therefore, ear flanges 92, 92a in a fixed position axially and laterally on frame 16 once the arm assemblies 29, 29a have been positioned against the log. Lateral movement of either, or both, of rollers 46, 46a as they travel over the log surface contour, is translated into reciprocal movement of rods 75, 75a in spring cans 76, 76a which in turn are loaded with the force of compression springs 84, 84a. Thus, opposed rollers 46, 46a can both move outwardly from the log, or inwardly, or one move inwardly as it follows the surface contour while the other moves outwardly over a branch nub and the log will always be held by the rollers and guided toward the center of the conveyor by virtually equal forces exerted on opposed sides by springs 84, 84a.

In short, arm assemblies 29, 29a are positioned together against the log surface by hydraulic cylinder 112, but operate completely independently of each other while rollers 46, 46a move laterally in and out over the log surface contour. Activation of hydraulic cylinder 112, as by switch 35, insures that both arm assemblies 29, 29a contact each log, regardless of wide variations in successive log diameters, so that each log is initially engaged by the roller on each one of each pair of opposed arm assemblies and springs 84, 84a are placed under initial compressive deformation so that the log is initially positioned and held under substantially equal lateral forces and subsequent lateral movement of the rollers as the log travels therebetween will be held against the surface under the compressive force of the springs. Similarly, successive arm assemblies 29', 29'' are activated and deactivated as the log enters and leaves, respectively, the gap between opposed rollers. If rod 114 of pressure cylinder 112 was in a retracted position 115 upon arrival of a log, some logs might have a sufficiently small diameter such that either or both of rollers 46, 46a would not contact the log surface to support and guide it under the force of springs 84, 84a. Conversely, if rod 114 is extended, the rollers are virtually closed and might be damaged by an oncoming log unless opened somewhat before the log arrives.

In a modified embodiment shown in FIG. 6, a plurality of photo-electric cells 120, 120a, 120', 120a' and 120'', 120a'' are positioned near each pair of arm assemblies so as to be activated or deactivated according to the presence or absence, respectively, of the log at the station near each pair of arm assemblies. Thus, when a log approaches the first arm assembly, photo-electric cells 120, 120a detect its presence and signal a control switch to activate hydraulic pressure cylinder 112 to position rollers 46, 46a against the log. When the log passes, photo-electric cells signal the hydraulic cylinder to open the arm assemblies through control switch 122. This procedure repeats as the log approaches and leaves the other succeeding arm assembly stations.

This type of control arrangement permits more automatic operation without operator assistance and also avoids the potential problem of damage to the arm assemblies if an oncoming log encounters the rollers on closed arm assemblies and forces them apart.

Various modifications will be apparent to those skilled in the art which can be made without departing from the spirit or scope of the invention described in the preferred embodiment. For example, the log contacting ends of the arm assemblies can merely consist of a log contacting skid, instead of being roller tipped. The hydraulic cylinder 112 securing the arm assemblies in position could be replaced by a ratchet arrangement or even, if necessary, by hand power with the arm assemblies secured in position by a pin. Also, the spring arrangement providing resilient guiding force to the log contacting end of the articulated arm assembly obviously could be mounted on any of the arm segments and provide comparable results.

We claim:

1. Apparatus for conveying logs, especially logs having irregular surface contours and protrusions, such as branch nubs, while maintaining the log in a centered position comprising:
   a frame member;
   conveyance means on said frame member for transporting logs along a centered path thereon;
   log centering means aligned on said frame member on either side of the conveyance means, said centering means comprising an articulated arm means positioned on either side of the conveyance means with each said centering means being movable laterally and independently of the other, each arm means having a first end adapted to engage substantially opposite sides of logs passing therebetween, and a second end linked to the corresponding second end of the other arm means;
   positioning means to move said linked second ends of the arm means axially of the log to thereby position the first ends of both arm means against the log to guide the log on the centered path;
   resilient means mounted on each of the articulated arm means urging the log engaging ends of the arm means against the log while tracking over the surface irregularities to maintain the log on a centered path;
   the log engaging ends of said arm means are each movable independently of their linked ends.

2. The apparatus as set forth in claim 1, wherein:
   the positioning means comprises a fluid power cylinder mounted on the frame member.

3. The apparatus as set forth in claim 1, wherein:
   said log engaging ends of the arm means include a powered roller which bears against the log surface and facilitates the maintenance of resilient force thereagainst, while guiding the log along on the conveyance means.

4. The apparatus as set forth in claim 1, wherein:
   said conveyance means comprises a powered endless conveyor.

5. The apparatus as set forth in claim 1, wherein:
   each articulated arm means comprises:
   a. a connecting arm segment having an outer end and one end pivotly attached to said frame member,
   b. a top arm segment having a first end adapted to engage the logs on said conveyor means and another end rotably secured to said frame member and in operable engagement with the connecting arm,
   c. a bottom arm segment having one end pivotly attached to the outer end of the connecting arm, and a second end linked to the positioning means;
   a spring mounted on one of said arm segments providing resilient force against relative movement between the log engaging end of the top arm segment and the end of said bottom arm segment linked to said positioning means by movement of the log engaging arm end as it travels over the log surface irregularities.

6. The apparatus as set forth in claim 5, wherein:
   said spring is a compression spring mounted on the bottom arm segment.

7. The apparatus as set forth in claim 1, wherein:
   said linked second ends of the arm means are slidably mounted on the frame member for reciprocal movement thereon parallel with the centered path of log travel.

8. Apparatus for conveying logs, especially logs having irregular surface contours and protusions such as branch nubs, while maintaining the log in a centered position, comprising:
   a frame member;
   conveyance means on said frame member for transporting logs along a centered path thereon;
   log centering means aligned along said frame member on either side of the conveyance means, said centering means including a plurality of units of articulated arm assembly means, said arm means of each unit positioned on either side of the conveyance means and having a first end adapted to engage one of substantially opposite sides of logs passing therebetween, and the second end linked to the corresponding second end of the other arm, said linked ends of each unit slidably mounted on the frame member for reciprocal movement thereon parallel with the centered path of log travel between selectable stopped positions;

positioning means to move said linked second ends of each unit of arm means to thereby position the first ends of both arm means against the log to guide the log on the centered path;

resilient means mounted on each of the articulated arm means, thereby permitting the log engaging ends of the arm means to resiliently bear against the log while tracking over its surface irregularities to maintain the log on a centered path, each log contacting end being independently movable relative to the corresponding end of the same and other arm means units;

signal means to selectively activate the positioning means to maintain the log engaging ends of the arm means in gapped position when no log is being conveyed therebetween and positioning the log engaging ends on the log surface upon the arrival of a log therebetween.

* * * * *